(12) United States Patent
Kuramori

(10) Patent No.: US 7,427,111 B2
(45) Date of Patent: Sep. 23, 2008

(54) WHEEL SET WITH DIFFERENT RIGIDITY BETWEEN FRONT AND REAR WHEELS

(75) Inventor: Akira Kuramori, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 441 days.

(21) Appl. No.: 10/523,260

(22) PCT Filed: Aug. 19, 2003

(86) PCT No.: PCT/JP03/10444

§ 371 (c)(1),
(2), (4) Date: Jan. 27, 2005

(87) PCT Pub. No.: WO2004/018227

PCT Pub. Date: Mar. 4, 2004

(65) Prior Publication Data

US 2005/0242536 A1   Nov. 3, 2005

(30) Foreign Application Priority Data

Aug. 23, 2002 (JP) ............................. 2002-244139

(51) Int. Cl.
*B60B 3/06* (2006.01)
(52) U.S. Cl. .................................. 301/65; 301/64.101
(58) Field of Classification Search ............ 301/63.101, 301/63.106, 64.101, 64.102, 65
See application file for complete search history.

(56) References Cited

FOREIGN PATENT DOCUMENTS

| JP | 2-71084 U | 5/1990 |
|---|---|---|
| JP | 3-7001 U | 1/1991 |
| JP | 10-236101 A1 | 9/1998 |
| JP | 2606530 Y2 | 9/2000 |
| JP | 2001-259769 A1 | 9/2001 |
| JP | 2001-301402 A1 | 10/2001 |
| JP | 2002-087003 A1 | 3/2002 |

OTHER PUBLICATIONS

International Search Report for PCT/JP03/10444 mailed on Dec. 2, 2003.
Takaaki Uno, "Sharyo Undo Seino to Chassis Mechanism", Kabushiki Kaisha Granpuri Shuppan, Sep. 10, 1994, pp. 68 to 70.

*Primary Examiner*—Jason R Bellinger
(74) *Attorney, Agent, or Firm*—Greer, Burns & Crain, Ltd.

(57) ABSTRACT

A tire wheel set includes a front wheel to be attached to a front axle of a vehicle, and a rear wheel to be attached to a rear axle thereof. The rear wheel is greater in rigidity than the front wheel.

18 Claims, 4 Drawing Sheets

WHEEL SET WITH DIFFERENT RIGIDITY BETWEEN FRONT AND REAR WHEELS

TECHNICAL FIELD

The present invention relates to a tire wheel set and a vehicle having the tire wheel set, and more particularly, to a tire wheel set and a vehicle having the tire wheel set, which can improve ride comfort.

TECHNICAL BACKGROUND

In order to improve ride comfort of vehicles, it is required to reduce vibration transmitted from the surface of a road to the vehicle. Tires which come into contact with the surface of a road and transmit vibration to the vehicle have been improved, and suspensions to be attached to a vehicle have been improved to make an improvement of ride comfort.

However, the improvement of tires or suspensions has its limits, and new techniques are desired to improve ride comfort.

DISCLOSURE OF THE INVENTION

An object of the present invention is to provide a tire wheel set and a vehicle having the tire wheel set capable of improving ride comfort of the vehicle.

In order to achieve the above object, a tire wheel set according to the present invention includes a front wheel to be attached to a front axle of a vehicle and a rear wheel to be attached to a rear axle thereof, the rear wheel being greater in rigidity than the front wheel.

A vehicle according to the present invention has the tire wheel set mentioned above.

In general, the ride comfort of a vehicle is greatly affected by vibration transmitted from the rear side to the vehicle. In view of this, according to the tire wheel set of the present invention described above, the rear wheel is higher in rigidity than the front wheel, and therefore, the vibration convergence property of the rear wheel can be improved because of the rigidity difference therebetween. Thus, vibration transmitted from the rear tire to the vehicle through the rear wheel is attenuated faster, and as a result, ride comfort can be improved.

BEST MODES FOR CARRYING OUT THE INVENTION

The embodiments of the present invention will be described in detail below with reference to the drawings.

Figure 1:
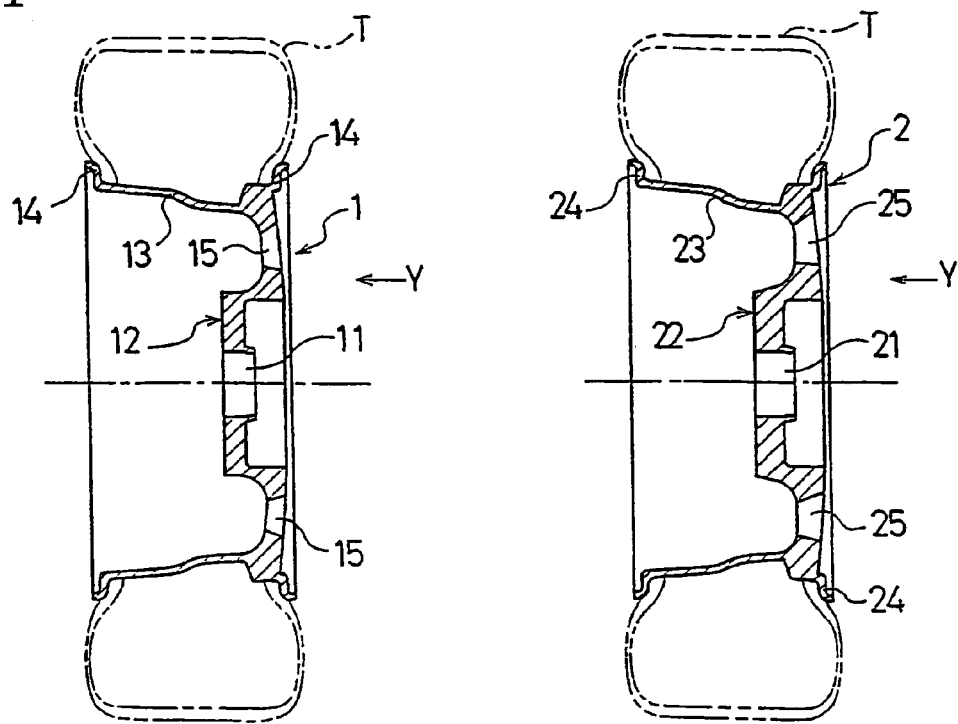
FIG. 1 is a cross-sectional view showing an embodiment of a tire wheel set according to the present invention.

FIG. 1 shows an embodiment of a tire wheel set according to the present invention. The tire wheel set includes two front wheels 1 to be attached to the front axle of a vehicle, and two rear wheels to be attached to the rear axle thereof. In the drawing, one front wheel 1 and one rear wheel 2 are shown, and the other wheels 1 and 2 are omitted, due to the same construction. The drawings described below are the same.

Each of the front wheels 1 comprises a disk 12 centrally having an attachment hole 11 for receiving the axle, and an annular rim 13 provided on the peripheral edge of the disk 12, and the rim 13 has annular flange portions 14 provided on both sides thereof.

The disk 12 has triangular opening 15, in a front view viewing in the direction of an arrow Y, surrondind the attachment hole in a predetermined interval along the circumferential direction of the disk, and the triangular opening 15 forms a design portion for aesthetic purposes to the wheel 1.

Each of the rear wheels 2 also comprises a disk 22 centrally having an attachment hole 21 for receiving the axle, and an annular rim 23 provided on the peripheral edge of the disk 12, and the rim 23 has annular flange portions 24 provided on both sides-thereof.

The disk 22 also has triangular openings 25, in a front view viewing in the direction of an arrow Y, surrounding the attachment hole 21 in a predetermined interval along the circumferential direction of the disk, and the triangular openings 25 forms a design portion for aesthetic purposes to the wheel 2.

The disk 22 of each rear wheel 2 is greater in thickness than the disk 12 of each front wheel 1, and the rear wheels 2 are higher in rigidity than the front wheels 1. In the drawing, reference character T denotes a tire mounted on each of the wheels 1 and 2.

The rest of each wheel 2 has the same thickness as that of each wheel 1 in this embodiment. However, the rim 23 of each rear wheel 2 may also be thicker than the rim 13 of each front wheel 1, or only the rim 23 maybe thicker than the rim 13, thereby increasing rigidity of each rear wheel 2.

Figure 2:
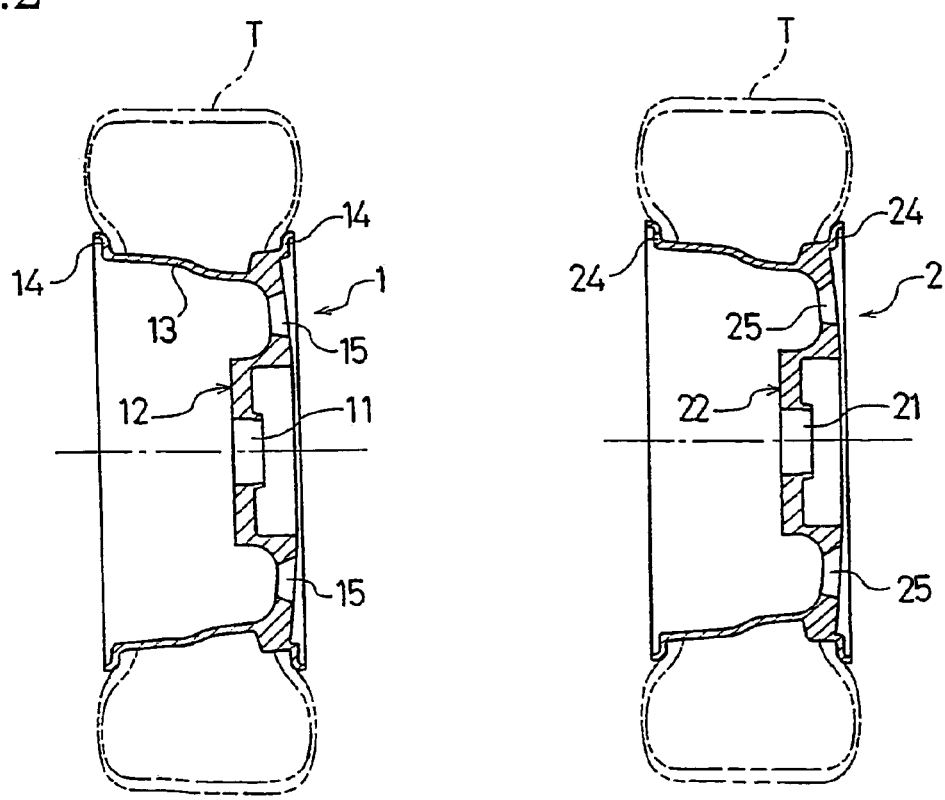
FIG. 2 is a cross-sectional view showing an alternative embodiment of a tire wheel set according to the present invention.

FIG. 2 shows an alternative embodiment of a tire wheel set according to the present invention. In this tire wheel set, the front wheels 1 and rear wheels 2 are the same in thickness with regard to respective corresponding parts. The rear wheels 2 are, however, higher in rigidity than the front wheels 1 by forming the rear wheels 2 of a material higher in rigidity than that of the front wheels 1.

Preferably, the material of the front wheels 1 includes, for example, an alloy of aluminum, and the material of the rear wheels 2 includes, for example, an alloy of magnesium.

Figure 3:
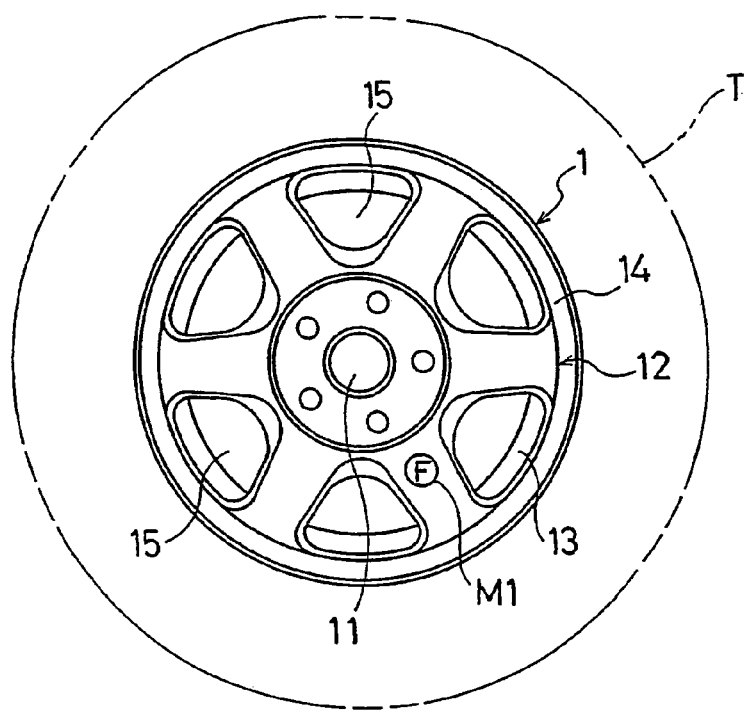
FIG. 3 is a cross-sectional view showing another alternative embodiment of a tire wheel set according to the present invention.
Figure 3:
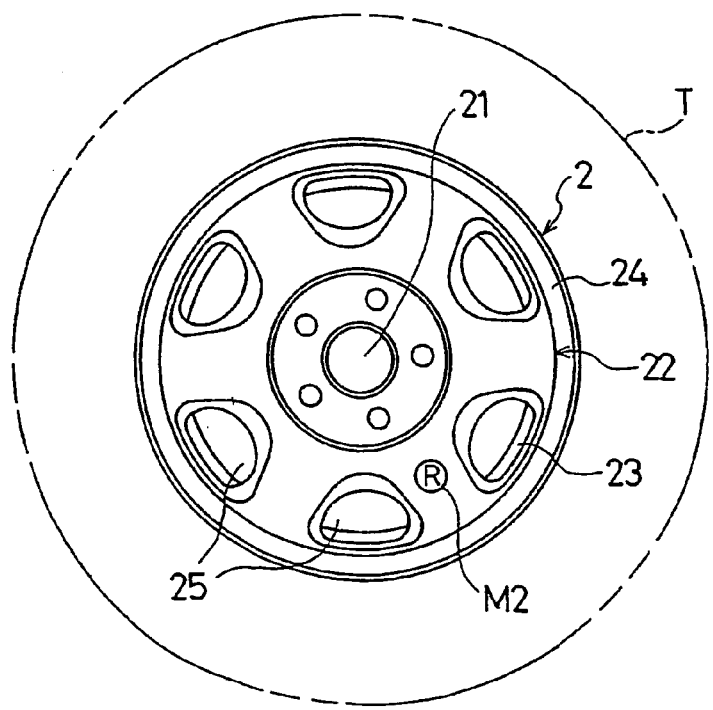

FIG. 3 shows another alternative embodiment of a tire wheel set according to the present invention. In this tire wheel set, the openings (design portion) 25 of the rear wheels 2 are smaller than the openings (design portion) 15 of the front wheels 1, whereby the disk 22 of each rear wheel 2 is greater in rigidity than the disk 12 of each front wheel 1 to thereby make the rear wheels 2 higher in rigidity than the front wheels 1.

The shape (design) of the openings 15 and 25 is not limited to the embodiment shown in FIG. 3, and any shape which can change the size of the openings 15 and 25 so that the rear wheel 2 is greater in rigidity than the front wheel 1 may be employed.

In the alternative of the openings 15 and 25, a design portion which is convex or concave in shape may be provided on the surface of each of the disks 12 and 22 so that the rear wheel 2 is higher in rigidity than the front wheel 1 with the design portion of the disk 12 being different in design from that of the disk 22.

In the embodiment shown in FIG. 3, the disks 12 and 22 have the design portions, and in addition or alternatively, the rims 13 and 23 may have design portions in the same manner as described above.

Figure 4:
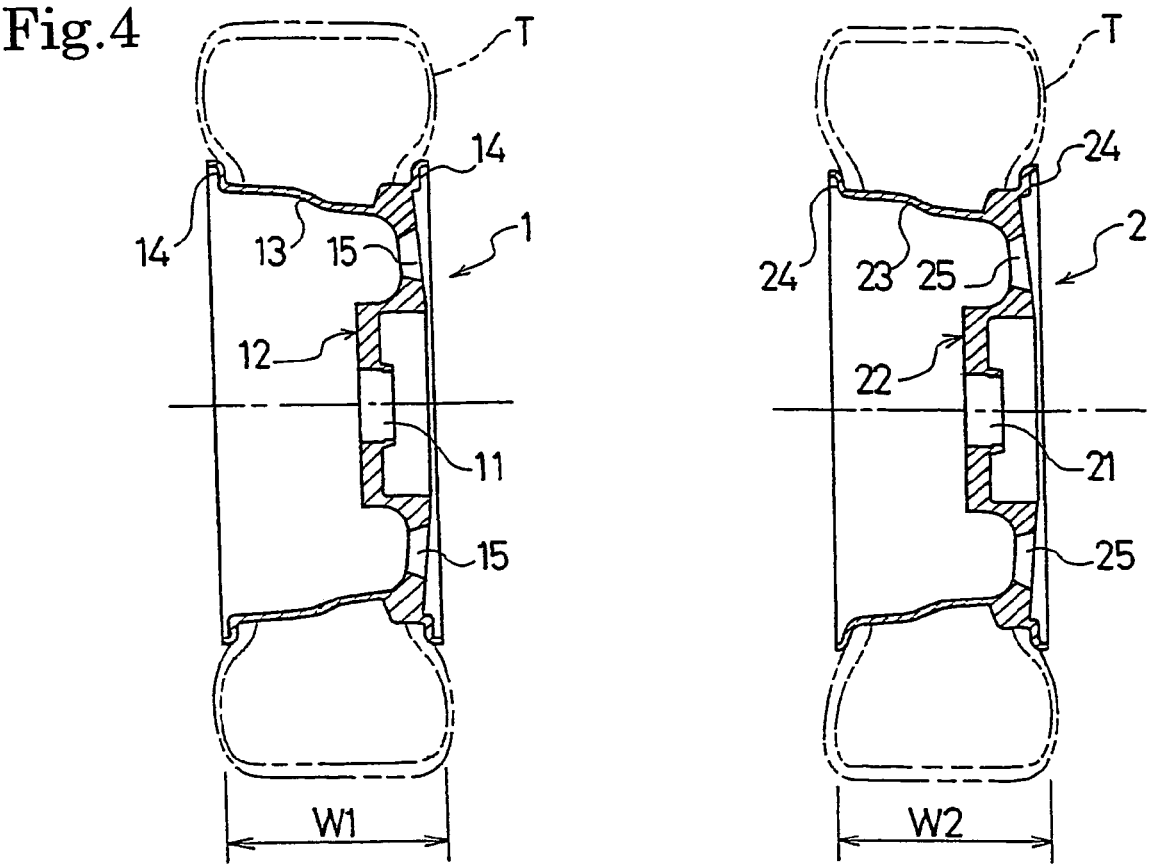
FIG. 4 is a cross-sectional view showing still another alternative embodiment of a tire wheel set according to the present invention.

FIG. 4 shows still another alternative embodiment of a tire wheel set according to the present invention. In this tire wheel set, the rim width W2 of the rear wheels 2 is smaller than the rim width W1 of the front wheels 1, whereby the rear wheels 2 are greater in rigidity than the front wheels 1. The front wheels 1 and rear wheels 2 are the same in size and in thickness with regard to respective corresponding parts.

In the case that the rim widths W1 and W2 of the front wheels 1 and rear wheels 2 are different as mentioned above, it is preferable that the difference between nominal rim widths thereof be ½ or 0.5 (a wheel which is ½ (0.5) to 2 less in nominal rim width than the front wheel 1 is used for the rear wheel 2). Note that the difference between nominal rim widths, referred herein, is a difference between numerical values, without alphabets, of nominal rim widths written in JATMA YEAR BOOK 2001. If the difference between nominal rim widths is less than ½ or 0.5, it is difficult to effectively make the rigidity of the rear wheel 2 higher than that of the front wheel 1. If the difference between nominal rim widths is greater than 2, steering stability is deteriorated.

Figure 5:
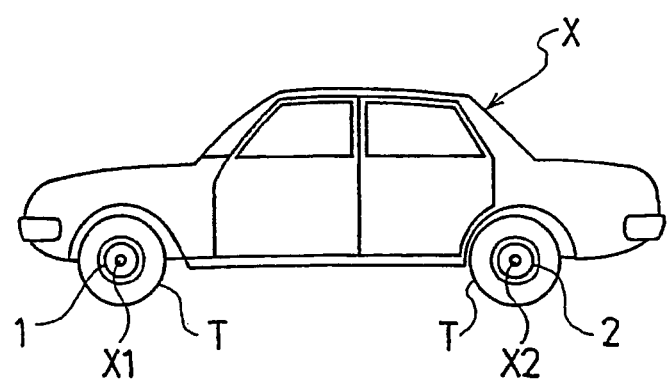
FIG. 5 is a side view showing a vehicle having the tire wheel set of the present invention.

FIG. 5 shows a vehicle having a tire wheel set according to the invention, and front wheels 1 and rear wheels 2 on which tires T are mounted are attached to the front axle X1 and rear axle X2 of a vehicle X, respectively.

In general, the ride comfort of the vehicle X is affected by vibration transmitted from the rear side to the vehicle X. According to the present invention described above, the rear wheels 2 are higher in rigidity than the front wheels 1 to thereby have a difference of rigidity between the wheels 1 and 2, thus allowing the vibration convergence property of the rear wheels 2 to be improved. The vibration transmitted from the rear tires to the vehicle X through the rear wheels 1 can therefore be attenuated faster. Accordingly, ride comfort can be improved.

In the present invention, the rigidity of the above-mentioned rear wheels 2 may be 10% to 60% higher than that of the front wheels 1. If the value is less than 10%, it is difficult to effectively improve ride comfort. If the value is greater than 60%, deterioration of steering stability is suffered.

It is desirable to provide identification marks M1 and M2 on the respective surfaces of the disks 12 and 22 of the front wheels 1 and rear wheels 2, as shown in FIG. 3, in order to facilitate differentiating the front wheels 1 from the rear wheels 2. However, it is not necessary to provide identification marks on both wheels 1 and 2 to identify them, but at least one of the front and rear wheels 1 and 2 may have an identification mark.

The front wheels 1 and the rear wheels 2 may be equal or different in size.

The constructions shown in the embodiments of FIGS. 1 to 4 may be properly combined to make the rear wheels 2 higher in rigidity than the front wheels 2.

Figure 6:
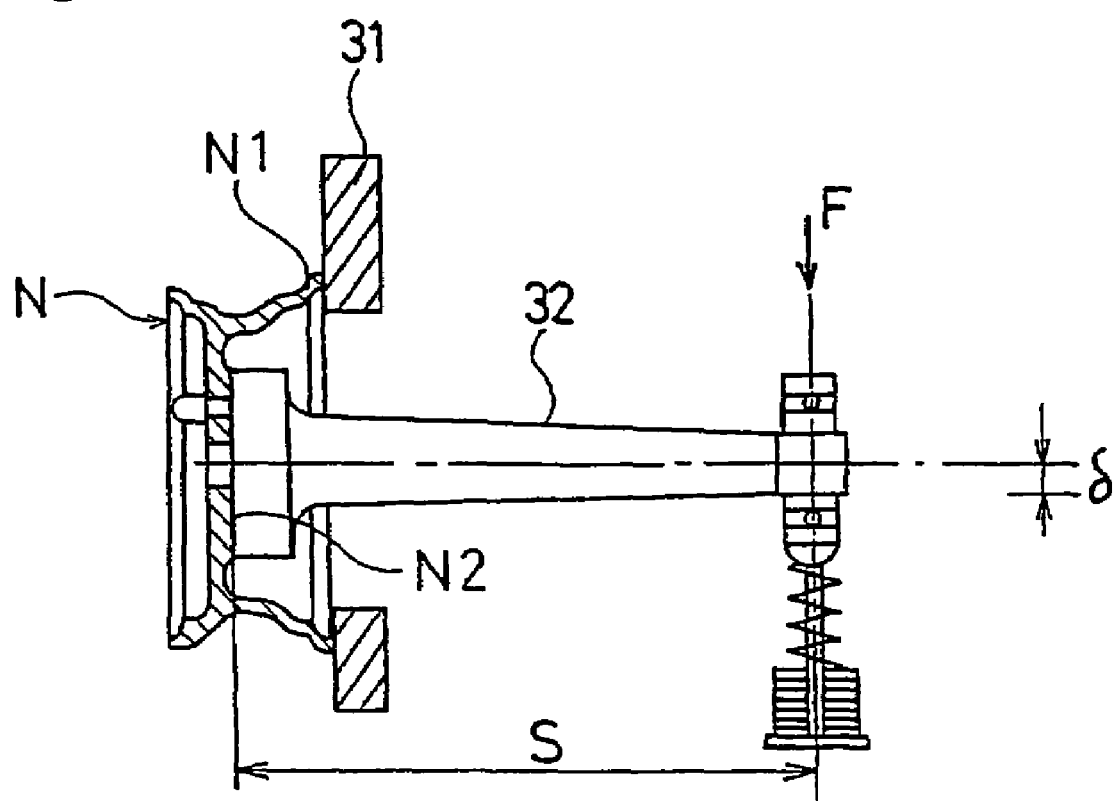
FIG. 6 is an explanatory drawing showing a method of measuring rigidity of a wheel.

The rigidity of the wheels of the present invention is determined as follows. As shown in FIG. 6, the rim flange N1 of a wheel N is securely attached to a stationary member 31, and a load arm 32 which is higher in rigidity than the wheel N is fastened to the disk surface N2 thereof. A force F is applied to the tip portion of the load arm 32, and an angular movement δ (rad) of the load arm 32 is then measured. The rigidity of the wheel N is determined in the following expression, wherein S is a distance (m) between the disk surface N2 and a location of the tip portion to which the force F is applied.

Wheel Rigidity $K(kN \cdot m/\mathrm{rad}) = FS^2/\delta$

The present invention is preferably applicable to a tire wheel set used for passenger cars, and more particularly, to a tire wheel set used for front-wheel-drive vehicles.

EXAMPLE

Prepared were present invention sets 1 to 6 and comparative sets 1 to 6, each set having two front wheels and two rear wheels the rigidity values of which were shown in Table 1, and a conventional set having front and rear wheels with the same rigidity, each wheel having the same rim size of 16×6J. The rigidity values shown in Table 1 were indicated by an index number, with the rigidity values of the conventional front and rear wheels being 100.

The present invention set 1 was structured, as shown in FIG. 1, so that the disks of the rear wheels were greater in thickness than those of the front wheels, and the comparative set 1 had front wheels and rear wheels structured opposite to the present invention set 1.

The present invention set 2 was structured, as shown in FIG. 2, so that the front wheels were formed of an alloy of aluminum and the rear wheels were formed of an alloy of magnesium, and the comparative set 2 had front wheels and rear wheels structured opposite to the present invention set 2.

The present invention set 3 was structured, as shown in FIG. 3, so that the openings of the rear wheels were smaller in size than those of the front wheels, and the comparative set 3 had front wheels and rear wheels structured opposite to the present invention set 3.

The present invention set 4 was structured, as shown in FIG. 4, so that the nominal rim width of the rear wheels were 2 less than that of the front wheels, and the comparative set 4 had front wheels and rear wheels structured opposite to the present invention set 4.

The present invention set 5 had front wheels and rear wheels the nominal rim width of which was ½ less than that of the front wheels, and the comparative set 5 had front wheels and rear wheels structured opposite to the present invention set 5.

The present invention set 6 was structured so that the rim thickness of the rear wheels was greater than that of the front wheels, and the comparative set 6 had front wheels and rear wheels structured opposite to the present invention set 6.

Tires having a tire size of 185/65R1were mounted on respective wheels of the test wheel sets, an air pressure of 200 kPa was applied thereto, and each set was attached to a front-wheel-drive passenger car with a displacement of 2.5 liters. An evaluation test for ride comfort was conducted in accordance with the following measurement method. The results shown in Table 1 were obtained.

Ride Comfort

A feeling test was conducted by each of five test drivers in a test course in such a manner that one test driver rides on and drive the passenger. Each result of the feeling test was evaluated by 5-point method, and each mark was an average value of the results of the five test drivers. The greater the value, the better the ride comfort.

TABLE 1

|  | Front Wheel Rigidity Index Number | Rear Wheel Rigidity Index Number | Ride Comfort |
|---|---|---|---|
| Conventional Set | 100 | 100 | 3 |
| Present Invention Set 1 | 100 | 120 | 3.5 |
| Comparative Set 1 | 120 | 100 | 2.5 |
| Present Invention Set 2 | 100 | 160 | 4 |
| Comparative Set 2 | 160 | 100 | 2 |
| Present Invention Set 3 | 100 | 120 | 3.5 |
| Comparative Set 3 | 120 | 100 | 2.5 |
| Present Invention Set 4 | 100 | 115 | 3.5 |
| Comparative Set 4 | 115 | 100 | 2.5 |
| Present Invention Set 5 | 100 | 110 | 3.5 |
| Comparative Set 5 | 110 | 100 | 2.5 |
| Present Invention Set 6 | 100 | 110 | 3.5 |
| Comparative Set 6 | 110 | 100 | 2.5 |

As can be seen from Table 1, the tire wheel sets of the present invention can improve ride comfort.

As illustrated above, according to the tire wheel set of the present invention, the rear wheel is greater in rigidity than the front wheel to thereby allow the vibration convergence property of the rear wheel to be improved, and therefore, ride comfort can be improved.

INDUSTRIAL APPLICABILITY

The present invention having the aforementioned excellent effect is very effectively applicable to a tire wheel set to be attached to a vehicle.

What is claimed is:

1. A tire wheel set for a front wheel drive passenger car, the tire wheel set having a front wheel to be attached to a front axle of a vehicle and a rear wheel to be attached to a rear axle thereof,
wherein the wheel has a wheel rigidity K (kN·m/rad) which is determined according to the equation $K=FS^2/\delta$, wherein (rad) is an angular movement of a load arm fastened to a disk surface of the wheel, the wheel having a higher rigidity than when force F (kN) is applied to a tip end portion of the load arm in a condition in which a rim flange of the wheel on an inner side of the vehicle is attached to a stationary member, and S (m) is a distance between the disk surface and a point of application of the force F on the tip end portion of the load arm, wherein the rear wheel is greater in rigidity than the front wheel.

2. A tire wheel set according to claim 1, wherein the front wheel and rear wheel each have a disk and a rim, and the disk and/or rim of the rear wheel is greater in thickness than that of the front wheel.

3. A tire wheel set according to claim 1, wherein the rear wheel is formed of a material greater in rigidity than that of the front wheel.

4. A tire wheel set according to claim 1, wherein the front wheel and rear wheel each have a design portion, and the rear wheel is greater in rigidity than the front wheel by changing the design of the design portions.

5. A tire wheel set according to claim 1, wherein the rear wheel has a rim width smaller than the front wheel.

6. A tire wheel set according to claim 5, wherein the front wheel and rear wheel have the substantially same size and thickness of respective corresponding parts thereof.

7. A tire wheel set according to claim 6, wherein a difference between nominal rim widths of the front wheel and rear wheel is 1/2 to 2.

8. A tire wheel set according to claim 1, wherein the rear wheel is 10% to 60% greater in rigidity than the front wheel.

9. A tire wheel set according to claim 1, wherein at least one of the front wheel and rear wheel has an identification mark.

10. A front wheel drive passenger car having a tire wheel set according to claim 1.

11. A vehicle having a tire wheel set according to claim 2.
12. A vehicle having a tire wheel set according to claim 3.
13. A vehicle having a tire wheel set according to claim 4.
14. A vehicle having a tire wheel set according to claim 5.
15. A vehicle having a tire wheel set according to claim 6.
16. A vehicle having a tire wheel set according to claim 7.
17. A vehicle having a tire wheel set according to claim 8.
18. A vehicle having a tire wheel set according to claim 9.

* * * * *